Figure 1:
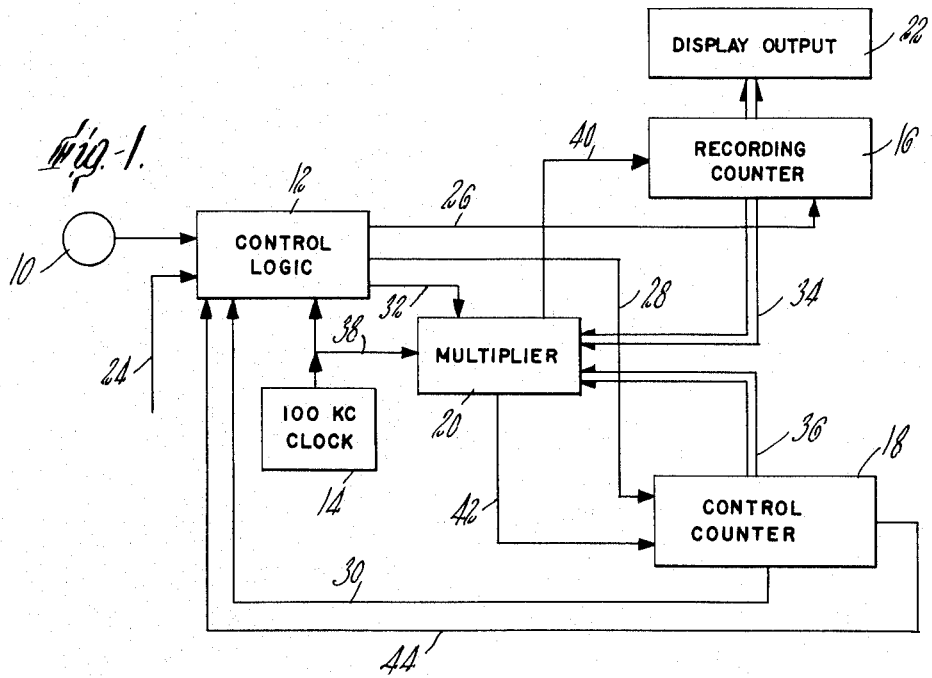

Nov. 30, 1965  AN WANG  3,221,250
DIGITAL FREQUENCY METER
Filed Nov. 2, 1962  2 Sheets-Sheet 1

United States Patent Office 3,221,250
Patented Nov. 30, 1965

3,221,250
DIGITAL FREQUENCY METER
An Wang, Lincoln, Mass., assignor to Wang Laboratories Inc., East Natick, Mass., a corporation of Massachusetts
Filed Nov. 2, 1962, Ser. No. 235,030
5 Claims. (Cl. 324—78)

This invention relates to apparatus for determining frequencies by counting techniques, and more particularly to new and improved apparatus for providing direct and accurate digital indications of frequency by electronic means.

It is an object of this invention to provide new and improved apparatus for measuring frequencies which provides a direct and accurate indication of frequency.

Another object of the invention is to provide new and improved apparatus for providing quickly an accurate digital read out of the frequency of input signals of a periodic nature sensed by the apparatus.

Still another object of the invention is to provide new and improved frequency measuring apparatus capable of providing precise digital indications of frequency values over a wide range of unknown frequencies.

A further object of the invention is to provide apparatus for measuring frequency values which provides a substantially immediately available read out of an unknown frequency in digital form and which may be operated to sense signals repetitively and measure their frequency in each sensing period in a versatile manner.

In the preferred embodiment of the invention there is provided a frequency meter having a digital read out which is especially useful for measuring signals of relatively low frequency. The apparatus employs two counters and associated control logic and provides a precise digital indication of the actual frequency of an unknown signal in a rapid manner. A signal of known frequency from a standard source which has a frequency much greater than that of the frequency of the unknown is utilized. The unknown frequency signal is sampled at a fixed position in each of its cycles and each cycle is recorded. Simultaneously the cycles of the signal of known frequency are recorded. This operation is continued for a fixed period of time (a fraction of a second in the preferred embodiment) plus the length of time necessary to complete the cycle of the unknown signal in progress. Control of both recording devices is then transferred to a multiplier circuit and both recording devices are stepped in the same direction at rates proportional to their settings at this time to a pre-established terminal value of the known frequency signal recording device. This stepping operation may be either forward or backward, but forward stepping is employed in the preferred embodiment. At the end of this controlled stepping operation the setting of the unknown frequency recording device provides a precise indication in digital form of the frequency of the unknown signal. The circuitry also includes provision for automatic resetting so that another frequency sampling operation may be promptly initiated if desired.

Figure 2:
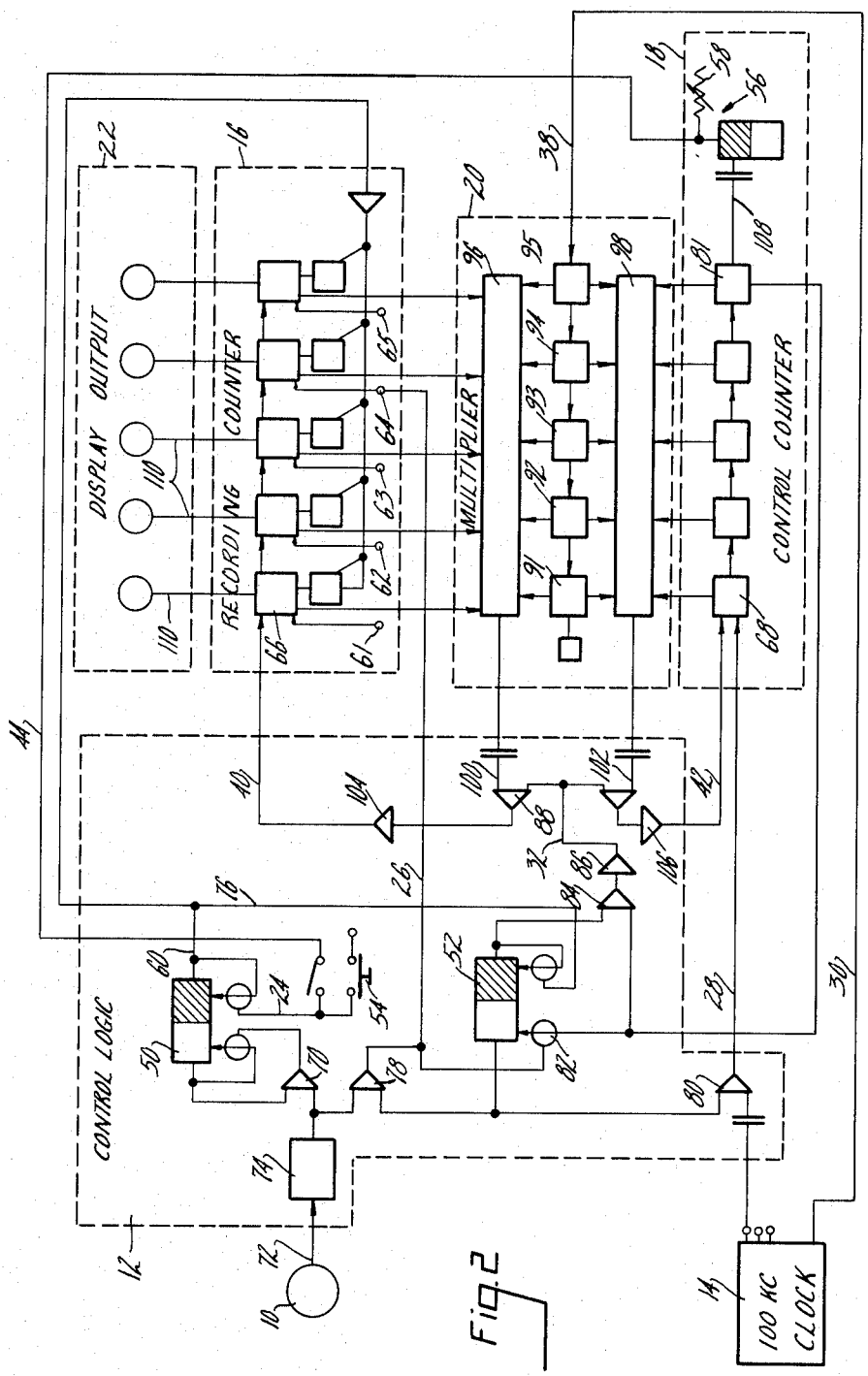

Other objects, features and advantages of the invention will be seen as the following description of a preferred embodiment of the invention progresses, in conjunction with the drawing, in which:

FIG. 1 is a block diagram of the digital frequency meter constructed in accordance with the principles of the invention; and FIG. 2 is a logic diagram illustrating features of the digital frequency meter shown in FIG. 1.

With reference to FIG. 1, there is shown in block diagram form a digital frequency meter in which a signal of unknown frequency from source 10 is applied to control logic 12. The circuitry also includes a one hundred kilocyce clock 14, an unknown frequency recording counter 16 and a control counter 18. The output signal from the clock 14 is also applied through multiplier circuit 20 to step the counters 16 and 18 as controlled by the logic 12. Connected to the output of counter 16 is a display device 22 which provides a continuous or periodic display of values set in the counter 16.

After the control logic is initially reset (by a pulse on line 24) signals from source 10 are sensed by control logic 12 which generates a pulse indicative of each cycle of the input signal on line 26 to step the recording counter 16 and simultaneously gates signals from the one hundred kilocycle clock 14 on line 28 to step the control counter 18. When the control counter reaches a pre-established value (in this case 80000) a signal on line 30 is applied to the control logic which conditions the logic to terminate the application of pulses on lines 26 and 28 at the beginning of the next cycle of the signal from source 10 and transfers counter stepping control to the multiplier circuitry by a signal on line 32.

The multiplier has two channels, and each is conditioned by the current count in the recording and control counters 16 and 18 respectively by signals applied over lines 34, 36. Each multiplier channel, in response to pulses applied from the clock 14 over line 38, steps the counters by pulses on lines 40, 42 at a rate proportional to their current setting. For example, if the recording counter contained an indication of 48000 and the control counter contained an indication of 80000, for each one hundred pulses applied to the multiplier circuitry from the clock 14 over line 38, forty-eight pulses would be provided on line 40 and eighty pulses would be provided on line 42. The contents of the counters 16, 18 at the time of transfer to multiplier control may be applied to a storage register so that the multiplier inputs over lines 34, 36 will remain constant or if the components resolve sufficiently rapidly, the inputs to the multiplier may be connected directly to the outputs from the counters so that the stepping rates increase as the counters are advanced. Thus, in the given example at the time that the control counter had contents of 90000, ninety pulses would be supplied over line 42 for every one hundred pulses supplied by the clock 14 in an advance from the eighty output pulses per one hundred input pulses rate. The rate of stepping the recording counter is advanced in similar manner.

When the control counter 18 reaches 100000 an output pulse is supplied on line 44 to the logic circuitry which terminates the stepping action of both counters. At this time the contents of the recording counter are transferred in decimal form to the display device 22 or other suitable utilization device to provide a digital indication of the number of cycles in the unknown signal during the sample period. During the period of time required for the control counter 18 to be stepped to 100000 (which relates the output to a time base) the pulses generated by clock 14 multiplied by the decimal fraction indicated by the contents of the recording counter 16 step the recording counter to produce an accurate digital frequency indication related to that time base (in this case one second) which is displayed in the output device. In the simple example of the recording counter 16 having contents of 48000 when the control counter 18 has contents of 80000 (when the control transfer is made), the display device would indicate 60.000 or a frequency of exactly 60 cycles per second. A read out having an accuracy to four decimal places is thus provided in just slightly more than one second. The output signal on line 44 may be connected to a suitable delay device for resetting the circuitry after the output has been displayed or otherwise suitably utilized so that another frequency measurement may be made.

A more detailed understanding of the apparatus of the invention may be had with reference to the logic block diagram of FIG. 2 which shows the apparatus indicated in block form in FIG. 1. The control circuitry includes a flip-flop 50 which is used for synchronizing purposes and a flip-flop 52 used to control the gating of pulses to counters 16 and 18. A reset pulse is applied on line 24 by a push button 54 or over line 44 from the monostable multivibrator 56 which is conditioned by the output end carry from counter 18. The time delay introduced by the single shot 56 is indicated to be adjustable by the variable resistor 58. With this input pulse to flip-flop 50 the right side conducts and produces an output signal which is applied over line 60 as a resetting pulse to counter 16 to set all the stages thereof to zero. That counter, and the control counter 18, both are decade counters which are indicated as having fix stages so that each may count to the value 99999. When the counter 18 is stepped the value one above 99999 it produces an output pulse or end carry on line 44. Similarly, when it is stepped from value 79999 to 80000 it produces an output level on line 30 which is removed simultaneously with the production of the end carry on line 44. The counter 16 has five input terminals 61–65 one of which may be selectively connected to line 24. In addition, the counter 16 has a second input to its least significant stage 66 over line 40. The least significant stage 68 of counter 18 is stepped by pulses applied over line 28 or line 42.

In addition to producing a resetting pulse on line 60 the input pulse on the right half of flip-flop 50 causes the left half of that flip-flop to produce an output level which conditions gate 70. The signal of unknown frequency from source 10 is applied over line 72 to the zero crossing detector 74 which produces an output pulse on the detection of a signal going from negative to positive and as gate 70 is conditioned that pulse is passed to the left input of flip-flop 50 to trigger it back to its initial stable state which transition produces a pulse on line 76 that triggers the right input of flip-flop 52 so that its left half produces a conditioning output to gates 78 and 80. This triggering of flip-flop 50 also removes the conditioning level from gate 70.

With the conditioning of gate 80 pulses from the clock source 14, which may, for example, be selected at a one kilocycle, ten kilocycle or one hundred kilocycle rate, are applied through gate 80 over line 28 to step the control counter 18. Also each subsequent zero crossing in a positive direction produces a pulse from detector 74 which is passed by gate 78 and applied over line 24 to step the recording counter 16. As indicated in FIG. 2 the input selection switch is set to terminal 64 (the input to the second most significant stage of the decade counter 16), while counter 18 is being stepped at a one hundred kilocycles per second rate. Counters 16 and 18 continue to be stepped as indicated until the most significant stage 81 of counter 18 reaches the value eight at which time a level is applied on line 30 to condition the input gate 82 to the left half of flip-flop 52.

The next pulse from the zero crossing detector 74 which is passed by gate 78 is applied through that gate 82 to trigger flip-flop 52, removing the conditioning level on gates 78 and 80 and producing a conditioning level on line 32 to the gate 84 which is also conditioned by the output from the counter 18 over line 30. The resulting signal level is applied through an inverter 86 to condition gates 88 and 90. The other inputs to these gates 88, 90 are from the multiplier 20, an example of suitable circuitry being shown in my Patent No. 3,015,806. The multiplier includes a frequency divider circuit including a stage corresponding to each stage of the decade counter so that stage 95 produces a one hundred kilopulse per second signal, stage 94 produces a ten kilopulse signal, stage 93 a one kilopulse signal, stage 92 a one hundred pulse signal and stage 91 a ten pulse per second signal. These signals are applied to multiplier logic indicated in the blocks 96, 98 which are conditioned by corresponding output stages of the counters. For example, if the least significant stage 68 of the control counter 18 contained the value eight the corresponding multiplier section (which is conditioned by the frequency divider block 91 (ten pulse per second output)) would produce eight pulses each second.

Those pulses produced by each multiplier section 96, 98 are applied over lines 100, 102 to gates 88 and 90 respectively. The output of gate 88 is applied over line 40 to step counter 16, and the output of gate 90 is applied over line 42 to step counter 18, each through an inverter 104, 106 respectively. This stepping operation continues until the counter 18 produces an end carry pulse on line 108. At the same time the conditioning level on line 30 is removed from gate 84 to thus remove the conditioning levels on gates 88 and 90 so that the stepping of the counters 16 and 18 are terminated. At this time the contents of the decade counter stages of counter 16 may be applied to display device 22 over lines 110.

In an example of the operation of the circuitry, assume that when gate 84 is conditioned the counter 16 contains the value 48000 (having been stepped forty eight times) and counter 18 contains the value 81000. The value 81,000 provides an accurate indication of the time required for 48 cycles of the unknown frequency. By multiplying both 81000 and 48000 by the same constant an indication of the actual frequency can be obtained. This constant is selected to be 100000 over 81000. In the multiplication operation the recording counter 16 is stepped at a rate proportional to its contents for a time controlled by the contents of the control counter 18 (the time required to step counter 18 to 100000). In this case this time is slightly greater than 0.19 seconds and the recording counter 16 has as its final contents 59814 which is an accurate indication of the frequency of the signal from source 10, i.e., 59.814 cycles per second.

The apparatus of the invention thus provides a direct read out of a frequency value in a measurement and calculation operation which requires approximately one second. It is a versatile apparatus which enables wide ranges of unknown frequency values to be obtained quickly and with precision. While a preferred embodiment of the invention has been shown and described various modifications thereof will be apparent to those skilled in the art and therefore it is not intended that the invention be limited to the disclosed embodiment or to details thereof and departures may be made therefrom within the spirit and scope of the claims.

I claim:

1. Apparatus for measuring the frequency of cyclical signals comprising a source of check signals having a frequency much greater than the frequency of the cyclical signals,
   means to record the number of cycles of said check signals and the number of cycles of said cyclical signals for a pre-established period plus the time required for the completion of the cycle of said cyclical signals,
   means to adjust the recorded values of said check signal cycles and said cyclical signal cycles at rates proportional to said values,
   and means to read out the adjusted value of the cyclical signal cycles when the adjusted recorded value of said check signal cycles reaches a pre-established terminal value.

2. Apparatus for measuring the frequency of an unknown alternating signal comprising a source of check signals having a frequency greater than the frequency of said unknown signal,
   sensing means responsive to a zero crossing in each cycle of said unknown signal to provide an output signal indicative thereof,
   recording means to record the number of cycles of said unknown signal and the number of cycles of said check signals,
   means responsive to said output signal to step said unknown signal cycle recording means, means responsive to said check signal sensor to step said check signal cycle recording means, means to terminate the recording of the cycles of said check signals and said unknown signal subsequent to said pre-established cycle count of said check signal recording means upon the next sensing of said particular portion of said unknown signal, and means to step said unknown signal cycle recording means to adjust the recorded value of said unknown signal cycles as a function of the recorded value of said check signal cycles.

3. Apparatus for measuring the frequency of an unknown signal comprising a source of check signals having a frequency greater than the frequency of said unknown signal, sensing means responsive to a particular portion of each cycle of said unknown signal to record the number of cycles of said unknown signal and the number of cycles of said check signals, means to terminate the recording of the cycles of said check signals and said unknown signal upon the next sensing of said particular portion of said unknown signal, means to adjust the recorded values of said check signal cycles and said unknown signal cycles at rates proportional to their recorded values, and means to read out the modified value of said unknown signal cycles when the modified value of said check signal cycles reaches a pre-established terminal value.

4. Apparatus for measuring the frequency of an unknown signal comprising a source of reference signals having a frequency much greater than the frequency of said unknown signal, a first recorder for recording the cycles of said unknown signal, a second recorder for recording the cycles of said reference signal, means controlled by a sensing of an unknown signal to initiate recording of cycles of said unknown signal and said reference signal, means responsive to said reference signal recorder reaching a pre-established value and the subsequent completion of a cycle of said unknown signal to terminate the stepping of said recorders in response to said reference and unknown signals, and means responsive to said signal responsive counter stepping termination means to step both said recorders in the same direction at rates proportional to their settings to a pre-established terminal setting of said second recorder such that the setting of said first recorder then provides a precise digital indication of the actual frequency of said unknown signal.

5. Apparatus for measuring the frequency of a cyclical signal comprising a reference signal having a frequency much greater than the frequency of said cyclical signal, a first recorder for recording the cycles of said cyclical signal, a second recorder for recording the cycles of said reference signal, means controlled by a sensing of a particular portion of said cyclical signal to initiate recording of cycles of said cyclical signal and said reference signal, means responsive to said reference signal recorder reaching a pre-established value and the subsequent completion of a cycle of said cyclical signal to terminate the stepping of said recorders in response to said reference and cyclical signals, multiplier means coupled to each of said recorders for producing pulse trains as a function of the setting of each recorder, and means responsive to said signal responsive counter stepping termination means to apply pulse trains from said multiplier to step both said recorders in the same direction at rates proportional to their settings to a pre-established terminal setting of said second recorder such that the setting of said first recorder then provides a precise digital indication of the actual frequency of said unknown signal.

References Cited by the Examiner

UNITED STATES PATENTS

| | | | |
|---|---|---|---|
| 2,576,900 | 11/1951 | Brockman | 324—79 X |
| 2,672,284 | 3/1954 | Dickinson | 235—132 |
| 2,853,235 | 9/1958 | Brinster et al. | 235—132 X |
| 3,039,685 | 6/1962 | Bagley et al. | 324—79 X |
| 3,062,052 | 11/1962 | Kolb | 235—132 X |

WALTER L. CARLSON, *Primary Examiner.*